United States Patent Office 3,145,194
Patented Aug. 18, 1964

3,145,194
PROCESS FOR POLYMERIZATION OR COPOLYMERIZATION OF OLEFINICALLY-UNSATURATED ORGANIC COMPOUNDS
Joseph Heckmaier, Eduard Bergmeister, and Gerhard Beier, all of Burghausen, Upper Bavaria, Germany, assignors to Wacker-Chemie G.m.b.H., Munich, Germany, a firm of Germany
No Drawing. Filed Nov. 22, 1961, Ser. No. 154,323
Claims priority, application Germany Nov. 25, 1960
6 Claims. (Cl. 260—79.3)

The present invention relates to a process for polymerization or copolymerization of olefinically-unsaturated organic compounds utilizing as redox catalysts the customary inorganic or organic per-compounds in combination with hydrogen or compounds which split off hydrogen and a colloidally dispersed noble metal of the VIII group of the periodic system as reducing agents.

The polymerization of unsaturated organic compounds in aqueous dispersions with the aid of redox catalyst systems is well known in the art. By this manner, polymerizates with satisfactory properties are obtained within relatively short reaction periods and at low temperatures.

Various redox catalyst systems have heretofore been described. These redox catalyst systems are composed of oxidizing compounds, such as inorganic or organic per-compounds, and reducing compounds, such as sodium formaldehyde sulfoxylate, thiosulfates, dithionites, bisulfites, amines, sulfinic acids or organic hydroxycarboxy compounds. In many cases, the concurrent use of heavy metal salts, such as iron, chromium, manganese, nickel or cobalt salts, is required in order to activate these systems. However, the employment of such metal salts often leads to undesirable results since, in the purification procedure, they are very difficult to completely remove from the polymerizates. Thus, for example, strong discolorations occur in many polymerizates even though they contain only a small amount of iron, chromium, manganese, nickel or cobalt salts.

It is an object of the present invention to develop a process for polymerization of olefinically-unsaturated compounds or mixtures thereof in aqueous dispersions in the presence of a redox catalyst system of an oxidizing agent and hydrogen and/or compounds which split off hydrogen in combination with a colloidally dispersed noble metal of the VIII group of the periodic system as a reducing agent.

It is a further object of the present invention to utilize as a reducing agent in a redox catalyst system for polymerization of olefinically-unsaturated compounds or mixture thereof, hydrogen or compounds which split off hydrogen in combination with a colloidally dispersed noble metal of the periodic system.

Another object of the invention is the development of a redox catalyst system for polymerization of olefinically-unsaturated compounds or mixtures thereof which, while containing heavy metals, do not discolor the polymerizates obtained.

These and other objects of the invention will become more apparent as the description thereof proceeds.

We have now found that the above-described disadvantages can be avoided in the polymerization or copolymerization of olefinically-unsaturated organic compounds in aqueous dispersion using redox systems containing inorganic or organic per-compounds as oxidizing agents, by using hydrogen and/or compounds which split off hydrogen in the presence of colloidally dispersed noble metals of the VIII group of the periodic system as reducing agents.

All olefinically-unsaturated compounds which are known to be polymerizable with the aid of free radical-forming compounds may be polymerized according to the process of the invention either alone or in admixture with each other. Examples of such monomers are the following: olefins, particularly lower alkenes, such as ethylene, propylene and butylene; vinyl halides, such as vinyl fluoride, vinylidene fluoride, vinyl chloride and vinylidene chloride; vinyl esters, particularly with alkanoic, alkanedioic, and benzene carboxylic acids having from 1 to 18 carbon atoms, such as vinyl acetate, vinyl propionate, vinyl laurate, etc.; vinylidene cyanide; acrylic compounds, such as acrylonitrile and acrylic acid amide and their α-lower alkyl substituted derivative; unsaturated monocarboxylic and dicarboxylic acids or their anhydrides particularly alkenoic, alkenedioic, cycloalkenoic and cycloalkenedioic acids having from 3 to 8 carbon atoms and their anhydrides, such as acrylic acid and methacrylic acid, crotonic acid, maleic acid, maleic acid anhydride, fumaric acid, itaconic acid, citraconic acid or tetrahydrophthalic acid; mono- and di-esters of these acids, particularly with alkanols, alkanediols, alkanetriols, and dialkylaminoalkanols having from 1 to 18 carbon atoms, such as the methyl, ethyl and butyl esters of acrylic acid and methacrylic acid, the 2-ethyl hexyl, glycidyl and dialkylaminoethyl esters of acrylic acid and methacrylic acid, ethyl crotonate; dimethyl, diethyl and di-n-butyl maleates, mono-(2-ethylhexyl) maleate, dimethyl, diethyl, di-n-butyl, di-(2-ethylhexyl) and dilauryl fumarates; alkenals, such as acrolein; allyl esters, such as allyl chloride, allyl acetate, diallyl phthalate and triallyl cyanurate; N-vinyl compounds, such as vinyl pyrrolidone; vinyl sulfonic acid and its salts; aromatic vinyl compounds, particularly vinyl benzenes, such as styrene and α-methyl styrene; dienes, particularly lower alkadienes and haloalkadienes, such as butadiene, isoprene and chloroprene.

Suitable per-compounds are all inorganic per-compounds which are customarily employed in redox catalyst systems, such as hydrogen peroxide; alkali metal persulfates, such as sodium persulfate, potassium persulfate and ammonium persulfate; alkali metal perborates; alkali metal perphosphates; alkali metal percarbonates; as well as organic per-compounds, particularly organic peroxides and hydroperoxides, such as tertiary-butyl hydroperoxide, cumene hydroperoxide, di-tertiary-butyl hydroperoxide, acetyl peroxide, benzoyl peroxide, lauroyl peroxide and 2,4-dichlorobenzoyl peroxide, as well as symmetric and asymmetric dialkyl percarbonates and acetyl cyclohexane sulfonyl peroxide. From 0.001% to 2%, especially from 0.001% to 0.5%, by weight based on the weight of monomer or monomers, of the per-compound are preferably employed.

In addition to hydrogen, those compounds are useful as hydrogen sources which split off hydrogen under the indicated polymerization conditions, such as hydrides of the alkali metals, for instance sodium hydride and lithium hydride, hydrides of the alkaline earth metals, such as calcium hydride, hydrides of the elements of the principal III group of the periodic system, such as boron hydrides and aluminum hydride, complex mixed hydrides, of the above metals such as sodium boron hydride, lithium borohydride and lithium aluminum hydride.

The partial pressure of the hydrogen which is used according to the invention in a redox catalyst system reducing agent for acceleration of the polymerization, is preferably between 0.01 and 100, especially between 0.1 and 10 atmospheres (absolute).

All noble metals of the VIII group of the periodic system, that is platinum, palladium, rhodium, ruthenium, osmium and iridium, may be used in colloidal form in the process according to the present invention. They are preferably employed in the form of aqueous sols, the preparation of which is well known. It is advantageous to stabilize the sols against coagulation in accordance with known methods, that is by addition of protective colloids, such as gelatins, gum arabic, polyvinyl alcohol, sodium albuminate, sodium alginate etc. For economic reasons and because of its particularly good catalystic properties, the palladium sol is preferred. The noble metal is preferably employed in an amount between 0.000001% and 0.1% by weight, especially between 0.00001% and 0.001% by weight, based on the weight of the monomer or monomers.

As customary for polymerizations of unsaturated organic compounds in aqueous dispersions, the weight ratio of water to monomer is from 1:2 to 10:1, preferably 2:3 to 4:1.

As dispersing agents, all emulsifiers, either anion active, cation active or nonionic, and protective colloids which are customarily employed for polymerization of unsaturated organic compounds in aqueous dispersions may be used, either alone or in admixture with each other. Anion active emulsifiers are preferred.

Examples of such anionic active emulsifiers are the following: alkali metal salts, especially the sodium and potassium as well as ammonium salts and alkaline earth metal salts, especially the calcium salts, of long chain fatty acids, such as lauric acid and stearic acid; of unsaturated long chain fatty acids, such as oleic acid; of resin acids, such as abietic acid; of albumin fatty acid condensation products; of acid phosphoric acid esters with long chain alkanols, such as diethylhexyl sodium posphate; of acid fatty alcohol sulfuric acid esters; of paraffin sulfonic acids, such as those which are on the market under the trademark "Mersolate"; of alkyl benzene or alkyl naphthalene sulfonic acids; and of sulfosuccinic acid dialkyl esters.

Cationic emulsifiers may also be used, such as dodecyltrimethyl-ammonium bromide and amphoteric emulsifiers such as dodecyl betaine.

Examples of nonionic emulsifiers which may be used are the following: partial fatty acid esters of polyhydroxy alcohols, such as glycerin-monostearate, sorbitol-monolaurate and sorbitol-monopalmitate; partial ethers of long chain alkanols and polyhydroxy alcohols; polyoxethylene ethers of fatty alcohols or aromatic hydroxy compounds; polyoxyethylene esters of fatty acids; as well as polypropylene oxide-polyethylene oxide condensation products known in commerce under the trade name "Pluronics."

Examples of protective colloids which may be used are the following: polyvinyl alcohol which may contain up to 40 mol percent of acetyl groups; gelatins; gum arabic; cellulose derivatives, such as water-soluble methyl cellulose, carboxymethyl cellulose, hydroxyethyl cellulose, hydroxymethyl cellulose; starch; polyvinyl pyrrolidone; salts of polyacrylic acids and alginic acid; water-soluble polyacrylamides; as well as copolymers of maleic acid or its hemiesters with vinyl compounds.

As is generally customary with polymerizations in aqueous dispersion, the amount of the ionic and nonionic emulsifiers is about 0.1% to 2% by weight, and the amount of the protective colloids is about 0.1% to 5% by weight, preferably 0.3% to 2% by weight.

Any or all of the buffer substances which are customarily used in connection with polymerizations in aqueous dispersion may be employed, such as sodium carbonate, ammonia, sodium acetate, trisodium phosphate, etc.

We have found that the redox catalyst system according to the present invention is extremely resistant to the poisoning effect of impurities. Therefore the materials required for the polymerization mixture need not be in a degree of purity higher than that which is technically customary.

The polymerization can be carried out between −100° and +100° C., however, in view of the thermal decomposition of many of the per-compounds above 50° C., it is preferable to operate between −80° and +50° C. It is an advantage of the process according to the present invention that polymerizations can be performed in an extraordinarily short time even at temperatures below 20° C. For instance, copolymers of ethylene, propylene and their homologs with vinyl esters and/or other olefinically-unsaturated compounds can be obtained with excellent yields at temperatures below +20° C.

In polymerization which are performed below 0° C., antifreeze agents, such as methanol, glycerin, ethylene glycol, ethylene glycol monoethyl ethers and sodium chloride are added to the water.

The polymerization according to the process of the invention may be performed continuously or by batch methods.

The polymerizate dispersions obtained thereby may be worked up according to known methods, such as by filtration, coagulation, spray drying or roller drying. The platinum metals which may possibly remain in the polymerizate do not in any way interfere with the properties of the products obtained thereby because of their low reactivity and because of their extremely low concentrations, moreover they cause no discoloration of the polymerizates obtained.

The following examples illustrate the practice of the invention, they are not however to be construed as limiting the same. It is obvious that other expedients known to those skilled in the art may be employed.

The parts indicated in the examples are always parts by weight.

*Example 1*

150 parts of water, 1 part of the sodium salt of paraffin sulfonic acid with 12 to 20 carbon atoms ("Mersolat"), 0.05 part of trissodium phosphate, 0.01 part of potassium persulfate and 0.00015 part of palladium in colloidal aqueous solution were admixed in a stirrer autoclave. The container was evacuated to remove the oxygen of the air and was subsequently filled with hydrogen until a pressure of 2 atmospheres was reached. Thereafter, 100 parts of vinyl chloride were pumped into the autoclave all at once and the mixture was polymerized at 40° C. accompanied by stirring. After 15 hours the polymerization was interrupted, the reaction being 94% complete, and the stable polyvinyl chloride dispersion thus obtained was spray dried.

*Example 2*

100 parts of vinyl chloride were polymerized at 0° C. by the procedure described in Example 1, except that 0.2 part of potassium persulfate and 0.0002 part of colloidal palladium were used instead of the amounts of potassium persulfate and palladium stated in Example 1. After 12 hours the polymerization was interrupted, the reaction being 95% complete. After spray drying of the dispersion, a polyvinyl chloride powder with extraordinary thremal stability and a K-value (according to Fikentscher) of 108 was obtained.

*Example 3*

100 parts of vinyl chloride were polymerized in the same manner at 30° C. with 0.00016 part of colloidal palladium and 0.02 part of tertiary butyl hydroperoxide. After 12 hours a 92% completion of reaction was achieved.

*Example 4*

Vinyl chloride was polymerized in the same manner with 0.005 part of peracetic acid and 0.00015 part of colloidal palladium in aqueous solution. At a temperature of 20° C. a 95% degree of completion of the reaction was obtained after 18 hours.

*Example 5*

200 parts of water, 140 parts of vinyl acetate, 1.2 parts of "Mersolat," 0.01 part of potassium persulfate and 0.00015 part of colloidal palladium were admixed in an autoclave provided with a stirrer. After evacuating the autoclave, hydrogen was introduced under pressure until a pressure of 2 atmospheres was reached, and the mixture was stirred for 14 hours at 0° C. A white, stable polyvinyl acetate dispersion was obtained having a solids content of 38.7% which corresponds to a 94% completion of the reaction.

*Example 6*

140 parts of water, 60 parts of methanol, 140 parts of vinyl acetate, 1.2 parts of "Mersolat" and 0.1 part of a 10% hydrogen peroxide solution were admixed in a container provided with a stirrer and were then cooled to —20° C. After removing the oxygen of the air, a palladium sol with 0.00016 part of palladium was added and thereafter hydrogen was introduced under pressure until a pressure of 3 atmospheres was reached. After 24 hours of stirring at —20° C., a white, stable polyvinyl acetate dispersion with a solids content of 37.9% was obtained, which corresponds to a 92% completion of the reaction. By alkaline saponification of the resin, a polyvinyl alcohol was obtained which exhibited a viscosity of 7,000 centipoises in a 4% aqueous solution. Reacetylation of the polyvinyl alcohol again resulted in a polyvinyl acetate which had the same degree of polymerization as the starting resin. Thus, a polyvinyl acetate which has an unbranched structure was obtained by the process described in Example 6.

*Example 7*

1,000 parts of water, 150 parts of methanol, 8 parts of sodium lauryl sulfate, 0.8 part of potassium persulfate, 0.5 part of sodium acetate, 0.001 part of colloidal palladium and 350 parts of vinyl acetate were admixed in a stirrer autoclave and the mixture was cooled to 0° C. After evacuating the autoclave, 250 parts of liquid ethylene were added, whereby a pressure of 13 atmospheres developed at 0° C. Subsequently, 5 atmospheres of hydrogen were introduced under pressure and the mixture was stirred for 24 hours at 0° C. A copolymer dispersion with a solids content of 30.1% was obtained, which corresponds to an 87% completion of the reaction. The emulsion was coagulated by adding a calcium chloride solution, the product was washed with water and dried at 80° C. The copolymer had a K-value of 125. By pressing at 150° C. a foil was obtained which had an elongation of 750% and a tear resistance of 165 kg./cm.²

Furthermore, after addition of peroxides, such as dicumyl peroxide and possibly in the presence of polyunsaturated compounds, such as diallyl phthalate or triallyl cyanurate, the product can be molded at 120–200° C. into rubbery shaped objects.

*Example 8*

A mixture as described in Example 7, except that 550 parts of vinyl acetate and 250 parts of ethylene were used, was polymerized at 0° C. accompanied by stirring. After 24 hours an 82% completion of the reaction was achieved. Upon analysis of the copolymer an oxygen content of 31.6% corresponding to an ethylene content of 15.9% by weight, was found. The K-value of the product was 126. A pressed foil produced therefrom exhibited an elongation of 550% and a tear resistance of 196 kg./cm.²

*Example 9*

115 parts of water, 35 parts of methanol, 1 part of sodium alkyl sulfonate, 0.1 part of potassium persulfate, 0.15 part of trisodium phosphate and 0.00017 part of palladium in colloidal aqueous solution were admixed in a stirrer autoclave and the mixture was cooled to —12° C. After evacuating the autoclave, 90 parts of vinyl chloride and 10 parts of propylene were added and 5 atmospheres of hydrogen were introduced under pressure. After 28 hours of stirring at —12° C. the polymerization was interrupted, the degree of completion of reaction being 75%. Upon analysis of the copolymer, a chlorine value of 52.3% was found, which corresponds to a propylene content of 7.9% by weight. The K-value of the product was 72.

The K-value given in the above examples represents a measure of the degree of polymerization. Further details may be found in "Kolloid-Zeitschrift," vol. 49, page 135 (1929), and in "Cellulosechemie," vol. 13, page 58 (1932).

The preceding examples were given as descriptive of the invention but are not to be construed as limiting the same. Such changes and modifications as would occur to one skilled in the art may be made without departing from the spirit of the invention or the scope of the appended claims.

We claim:
1. A process for the production of a polymerizate selected from the group consisting of homopolymerizates and copolymerizates which comprises the steps of reacting olefinically unsaturated organic compounds polymerizable with the aid of free-radical forming compounds, in an aqueous dispersion in the presence of a redox polymerization catalyst system of (1) an oxidizing agent selected from the group consisting of inorganic per-compounds, organic peroxides and organic hydroperoxides and (2) free hydrogen in a partial pressure of from 0.01 to 100 atmospheres (absolute) with substantial exclusion of oxygen, in combination with a colloidally dispersed noble metal selected from the group consisting of platinum, palladium, rhodium, ruthenium, osmium and iridium in water, as a reducing agent, at a temperature between —100° C. and below the decomposition temperature of said oxidizing agent and recovering said polymerizate.

2. The process of claim 1 wherein said temperature is between —80° C. and +50° C.

3. The process of claim 1 wherein said colloidally dispersed noble metal is in the form of an aqueous sol.

4. The process according to claim 1 wherein the polymerization is carried out in the presence of from 0.000001% to 0.1% by weight, based on the weight of said monomer, of said colloidally dispersed noble metal.

5. The process of claim 1 wherein said reducing agent is hydrogen and an aqueous sol of palladium.

6. A process for the production of a vinyl polymerizate selected from the group consisting of homopolymerizates and copolymerizates which comprises the steps of reacting a vinyl compound selected from the group consisting of vinyl halides; vinyl esters with carboxylic acids having from 1 to 18 carbon atoms selected from the group consisting of alkanoic, alkanedioic and benzene carboxylic acids; vinylidine cyanide; N-vinyl pyrrolidine; vinyl sulfonic acid, and vinyl benzenes in an aqueous emulsion in the presence of a redox polymerization catalyst system of (1) from 0.001% to 0.5% by weight, based on the weight of said vinyl compound of an oxidizing agent selected from the group consisting of inorganic per-compounds, organic peroxides and organic hydroperoxides and (2) hydrogen in a partial pressure of between 0.1 and 10 atmospheres (absolute) with the substantial exclusion of oxygen in combination with an aqueous colloidal sol of a noble metal selected from the group consisting of palladium, ruthenium, rhodium, osmium, iridium and platinum, said metal being present in an amount between 0.00001% and 0.001% by weight, based on the weight of said vinyl compound, at a temperature between about —80° C. and +50° C. and recovering said vinyl polymerizate.

References Cited in the file of this patent
UNITED STATES PATENTS

| 2,579,061 | Woodward | Dec. 18, 1951 |
| 2,692,261 | Peters et al. | Oct. 19, 1954 |
| 2,945,845 | Schmerling | July 19, 1960 |

FOREIGN PATENTS

| 837,251 | Great Britain | June 9, 1960 |